(No Model.)

J. L. PACKARD.
RAND GUARD.

No. 473,428. Patented Apr. 19, 1892.

Witnesses.
Fred S. Greenleaf
Edward F. Allen

Inventor.
Jerome L. Packard
by Crosby & Gregory
attys.

UNITED STATES PATENT OFFICE.

JEROME L. PACKARD, OF BOSTON, ASSIGNOR TO JAMES W. BROOKS, TRUSTEE, OF CAMBRIDGE, MASSACHUSETTS.

RAND-GUARD.

SPECIFICATION forming part of Letters Patent No. 473,428, dated April 19, 1892.

Application filed December 7, 1891. Serial No. 414,307. (No model.)

*To all whom it may concern:*

Be it known that I, JEROME L. PACKARD, of Boston, county of Suffolk, State of Massachusetts, have invented an Improvement in Rand-Guards, of which the following description, in connection with the accompanying drawings, is a specification, like letters on the drawings representing like parts.

In the trimming of heels and edges of soles of boots or shoes it is customary to employ a rand-guard to bear on the upper at the heel-seat or on the upper next the sole edge; but this rand-guard has its objections in use, among which may be enumerated the rubbing friction of the guard against the upper, and frequently the upper is marked, roughened, heated, or burned. In my efforts to obviate this rubbing, heating, or burning of the upper I have provided the said guard with a loose tire or section, which contacts with the upper while the body of the rand-guard rotates within it.

My invention therefore consists, essentially, in a rand-guard composed of a rotatable circular body or part having a grooved periphery and loose tire-like-acting edge in said groove and movable independently of the body to bear against the upper and constitute a track for the body during its rotation; also, in the combination, with a rotary trimmer-cutter, of a rand-guard composed of a rotatable circular body having a grooved periphery and a loose tire in said groove and movable independently of the body to constitute a track for the said body and in which it rotates, as will be described.

Figure 1:
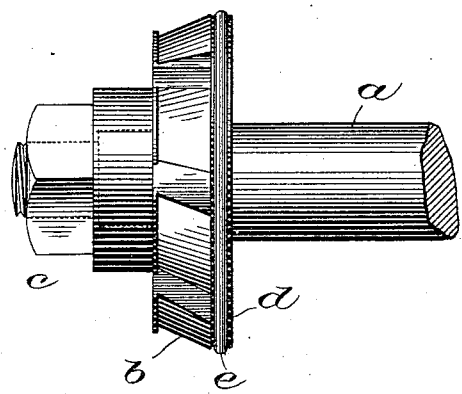
Figure 2:
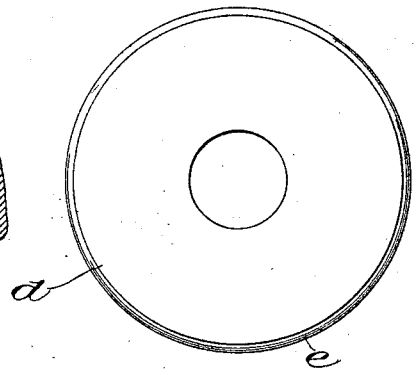
Figure 3:

Figure 1 in side elevation represents a trimmer-cutter, its shaft, and my improved rand-guard. Fig. 2 is a side elevation of the rand-guard; Fig. 3, a section of the rand-guard shown in Fig. 2; and Fig. 4 is a modification.

The shaft $a$ and trimmer-cutter $b$ are and may be of any usual or suitable construction, the cutter being confined on the shaft by a nut $C$ or in other usual or suitable manner, so as to rotate with the shaft. At one end of the cutter is a rand-guard composed of a body $d$, the periphery of which is so shaped as to receive loosely a suitable tire or edge $e$, the fit between the body and tire being for the best results such that the tire merely rolls over or along the upper without rubbing or abrasing it, while the body revolves more rapidly within the said tire.

The exact shape of the periphery of the body of the guard is immaterial.

Figure 4:
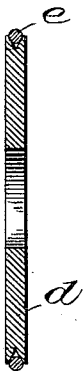

In Figs. 1 to 3 the body is provided with a round hollow groove to receive a tire, which is round in cross-section, while in Fig. 4 the groove is V-shaped and receives a tire preferably shaped to form a track for the body to run on.

Having described my invention, what I claim, and desire to secure by Letters Patent, is—

1. A rand-guard composed of a rotatable circular body having a grooved periphery and a loose tire or edge in said groove and movable independently of the body to bear against the upper and constitute a track for the body during its rotation, substantially as described.

2. A rotary trimmer-cutter, combined with a rand-guard composed of a rotatable circular body having a grooved periphery and a loose tire in said groove and movable independently of the body to constitute a track for the said body and in which it rotates, substantially as described.

In testimony whereof I have signed my name to this specification in the presence of two subscribing witnesses.

JEROME L. PACKARD.

Witnesses:
FREDERICK L. EMERY,
FRANCES M. NOBLE.